DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 1, 1974

927 O.G. 7

T927,003

ANTISTATIC POLYESTER FIBERS AND FABRICS

James E. Blakemore, 928 Springbrook Drive, Kingsport, Tenn. 37663

Filed June 18, 1973, Ser. No. 370,883

**Int. Cl. C08j *1/44***

U.S. Cl. 117—139.5

No Drawing. 25 Pages Specification

An article of manufacture comprised of a shaped article formed of a hydrophobic material which in dry condition normally tends to develop static charges of electricity thereon, the surface of the material carrying adhered thereon, for the purpose of reducing the tendency of the article to develop static charges, a conducting random copolymer having the structure:

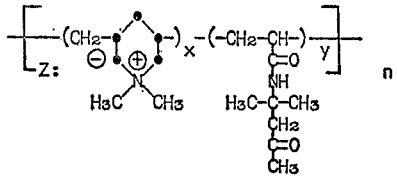

wherein $x$ and $y$ are variable integers of 1 or greater and Z is an anion. Normally, the random copolymer will be present in the amount of about 0.1 to 3.0 weight percent. However, the preferred range is in the amount of 1.0 to 2.0 weight percent. Also, the invention encompasses a process for treating textile materials comprising hydrophobic fibrous materials which in dry condition normally tends to develop static charges of electricity thereon, said process comprising applying to said textile material a conducting random copolymer having the structure set forth above, and curing said conducting copolymer by heating at a temperature of about 80° to 170° C. for 1 to 15 minutes. Further, the invention encompasses the copolymer being applied as an aqueous solution comprising conducting copolymer present in the amount of 1 to 5 weight percent, hydrazine hydrate present in the amount of about 1 weight percent, and water present in the amount of 98 to 94 weight percent.